(12) United States Patent
Benedetti

(10) Patent No.: US 12,000,100 B2
(45) Date of Patent: Jun. 4, 2024

(54) SNOW-CLEARING TRAILER WITH SECURE DRAWBAR LOCKING

(71) Applicant: SOVIAR, Passy (FR)

(72) Inventor: Michel Benedetti, Passy (FR)

(73) Assignee: SOVIAR, Passy (FR)

( * ) Notice: Subject to any disclaimer, the term of this patent is extended or adjusted under 35 U.S.C. 154(b) by 274 days.

(21) Appl. No.: 17/580,820

(22) Filed: Jan. 21, 2022

(65) Prior Publication Data

US 2022/0235530 A1    Jul. 28, 2022

(30) Foreign Application Priority Data

Jan. 28, 2021    (FR) ...................................... 21 00790

(51) Int. Cl.
  *E01H 5/06*    (2006.01)
  *B62D 13/02*   (2006.01)

(52) U.S. Cl.
  CPC ........... *E01H 5/068* (2013.01); *B62D 13/025* (2013.01); *E01H 5/067* (2013.01)

(58) Field of Classification Search
  CPC .............................. B62D 13/025; E01H 5/067
  See application file for complete search history.

(56) References Cited

U.S. PATENT DOCUMENTS

| | | | |
|---|---|---|---|
| 4,902,030 A | 2/1990 | Andre | |
| 2006/0143952 A1* | 7/2006 | Lannert | E01H 5/067 |
| | | | 37/268 |
| 2017/0080928 A1* | 3/2017 | Wasiek | B60W 50/14 |
| 2020/0114710 A1* | 4/2020 | Kim | B60W 50/14 |
| 2021/0285171 A1* | 9/2021 | Weihl | E01H 5/067 |
| 2022/0235529 A1* | 7/2022 | Benedetti | E01H 5/068 |

FOREIGN PATENT DOCUMENTS

| | | | | |
|---|---|---|---|---|
| EP | 3196361 A1 * | 7/2017 | | E01H 5/067 |
| EP | 3196361 A1 | 7/2017 | | |
| FR | 2492331 A1 | 4/1982 | | |
| WO | 2013175097 A1 | 11/2013 | | |

OTHER PUBLICATIONS

Machine Translation of Benedetti's reference (EP-3196361-A1) (Year: 2017).*

* cited by examiner

*Primary Examiner* — Tarek Elarabi
(74) *Attorney, Agent, or Firm* — William H. Eilberg

(57) ABSTRACT

Snow-clearing trailer (1) having a chassis (5) extending longitudinally in a chassis direction (I-I) and having a drawbar (9). Pivoting means (11) allow the selective pivoting movement of the chassis (5) and the drawbar (9) with respect to one another. A drawbar locking bar (12) of fixed length can be attached to the drawbar (9) and to the chassis (5) so as to immobilize the drawbar (9) on the chassis (5) in a transport position. Detection means (13) generate an attachment signal when the drawbar locking bar (12) is attached to the drawbar (9) and to the chassis (5). The detection means (13) and disabling means are arranged in such a way that when the detection means (13) generate an attachment signal, the disabling means prevent any actuation of the pivoting means (11).

6 Claims, 5 Drawing Sheets

SNOW-CLEARING TRAILER WITH SECURE DRAWBAR LOCKING

TECHNICAL FIELD OF THE INVENTION

The present invention relates to the clearing of snow from road carriageways, and relates more particularly to a snow-clearing trailer intended to be towed by a vehicle with a towing hitch.

In order to clear snow from several lanes of a carriageway simultaneously using a single towing vehicle, a snow-clearing trailer as described in the document EP 3 196 361 A1 is known, which has:
- a chassis extending longitudinally in a chassis direction and having a snow-clearing blade
- at least one wheel arranged so as to support the chassis on the ground, an axle of said wheel being selectively orientable by orientation means between a first wheel position, in which an axis of the axle about which the wheel rotates is perpendicular to the chassis direction, and at least a second wheel position, in which the axis of the axle about which the wheel rotates makes with the chassis direction an axle angle that is different than 90°,
- a drawbar extending in a drawbar direction between first and second drawbar ends,
- at the first drawbar end, first connection means allowing a freely pivoting connection with the towing hitch of the towing vehicle about a first pivoting direction substantially perpendicular to the plane defined by the chassis direction and the axis of the axle about which said at least one wheel rotates, wherein:
- at the second drawbar end, the drawbar is articulated to the chassis so as to pivot about a second pivoting direction substantially perpendicular to the plane defined by the chassis direction and the axis of the axle about which said at least one wheel rotates,
- pivoting means allow the selective pivoting movement of the chassis of the trailer and the drawbar with respect to one another, and the fixing of the relative angular position of the chassis of the trailer and of the drawbar, between a transport position, in which the chassis direction and the drawbar direction are substantially parallel, and at least one snow-clearing position, in which the chassis direction and the drawbar direction form a non-zero angle with one another,
- a drawbar locking bar is provided, which has a fixed length, of which one end can be attached to the drawbar and of which the other end can be attached to the chassis so as to immobilize the drawbar on the chassis in the transport position.

A drawback of such a trailer is that it has numerous degrees of freedom, and this makes its use complex for the operator, who already has to manage many things, including the correct road holding and the course of the towing vehicle on the roadway, the course of the snow-clearing trailer with respect to the edge of the roadway, the orientation of the snow-clearing blade that the towing vehicle generally has mounted on it, any substances that need to be spread on the roadway (salt, grit, etc.), and the possible presence of obstacles on the roadway or at the edge thereof, etc.

The document U.S. Pat. No. 4,902,030 A describes a trailer having a drawbar having a fixed orientation with respect to the chassis of the trailer.

The document FR 2 492 331 A1 describes a trailer for agricultural use having a drawbar mounted so as to pivot with respect to the chassis of the trailer about a vertical axis.

SUMMARY OF THE INVENTION

A problem addressed by the present invention is that of simplifying the operation of a snow-clearing trailer as described above, and to limit the risk of improper operation that could lead to damage to the snow-clearing trailer.

In order to achieve these objectives as well as others, the invention proposes a snow-clearing trailer intended to be towed by a towing vehicle with a towing hitch, said snow-clearing trailer having:
- a chassis extending longitudinally in a chassis direction and having a snow-clearing blade
- at least one wheel arranged so as to support the chassis on the ground, an axle of said wheel being selectively orientable by orientation means between a first wheel position, in which an axis of the axle about which the wheel rotates is perpendicular to the chassis direction, and at least a second wheel position, in which the axis of the axle about which the wheel rotates makes with the chassis direction an axle angle that is different than 90°,
- a drawbar extending in a drawbar direction between first and second drawbar ends,
- at the first drawbar end, first connection means allowing a freely pivoting connection with the towing hitch of the towing vehicle about a first pivoting direction substantially perpendicular to the plane defined by the chassis direction and the axis of the axle about which said at least one wheel rotates, wherein:
- at the second drawbar end, the drawbar is articulated to the chassis so as to pivot about a second pivoting direction substantially perpendicular to the plane defined by the chassis direction and the axis of the axle about which said at least one wheel rotates,
- pivoting means allow the selective pivoting movement of the chassis of the trailer and the drawbar with respect to one another, and the fixing of the relative angular position of the chassis of the trailer and of the drawbar, between a transport position, in which the chassis direction and the drawbar direction are substantially parallel, and at least one snow-clearing position, in which the chassis direction and the drawbar direction form a non-zero angle with one another,
- a drawbar locking bar is provided, which has a fixed length, of which one end can be attached to the drawbar and of which the other end can be attached to the chassis so as to immobilize the drawbar on the chassis in the transport position; according to the invention:
- the snow-clearing trailer has detection means, which are able to generate an attachment signal when the drawbar locking bar is attached to the drawbar and to the chassis,
- the snow-clearing trailer has first disabling means that are able to disable the pivoting means,
- the first disabling means and the detection means are arranged in such a way that when the detection means generate an attachment signal, the first disabling means prevent any actuation of the pivoting means.

With such a device, when the drawbar locking bar is present, any actuation of the pivoting means is automatically prevented. This limits the risk of unintentional damage to the snow-clearing trailer by actuation of the pivoting means in the presence of the drawbar locking bar. Thus, once the drawbar locking bar has been put in place, the operator no longer needs to be concerned with managing the pivoting means.

Advantageously, in order to further limit the risk of improper handling, provision can be made that:
the first disabling means are able to disable the orientation means,
the first disabling means and the detection means are arranged in such a way that when the detection means generate an attachment signal, the first disabling means prevent any actuation of the orientation means.

Thus, once the drawbar locking bar has been put in place, the operator no longer needs to be concerned with managing the orientation means.

Preferably, in order to further limit the risk of improper handling, provision can be made that:
the snow-clearing blade is articulated so as to pivot on the chassis and is movable, by movement means, about a blade pivoting direction substantially parallel to the chassis direction, between a rest position and a working position,
the snow-clearing trailer has second disabling means that are able to disable the movement means,
the second disabling means and the detection means are arranged in such a way that when the detection means generate an attachment signal, the second disabling means prevent any actuation of the movement means.

Thus, once the drawbar locking bar has been put in place, the operator also no longer needs to be concerned with managing the movement means.

Advantageously, the detection means can have at least one proximity sensor that is able to detect the presence of an end of the drawbar locking bar on the chassis and/or on the drawbar. Such a sensor makes it possible to detect the presence of the drawbar locking bar automatically, without manipulation on the part of the operator other than simply putting the drawbar locking bar in place.

Preferably, the proximity sensor is an inductive sensor or a capacitive sensor. Such a sensor is both simple and sufficiently robust to operate in a satisfactory manner in the often complicated working environment of snow-clearing vehicles (low temperatures, external precipitation, etc.).

According to another aspect, the present invention proposes a snow-clearing assembly having:
a towing vehicle,
a snow-clearing trailer as described hereinabove,
alarm means, which are able to generate an alarm signal that is perceivable by an operator stationed in the driving cab of the towing vehicle, preferably a visual alarm signal, when the detection means generate an attachment signal.

The operator stationed in the driving cab of the towing vehicle is thus warned of the presence of the drawbar locking bar. A visual, and especially not audible, alarm signal should be preferred, in order not to trouble the operator who has to manage many things.

BRIEF DESCRIPTION OF THE DRAWINGS

Other objects, features and advantages of the present invention will become apparent from the following description of particular embodiments, which description is given with reference to the appended figures, in which.

DESCRIPTION OF THE PREFERRED EMBODIMENTS

Where identical numerical references are used in a number of embodiments of the invention, these numerical references refer to elements that are identical or similar in each of the embodiments.

Figure 1:
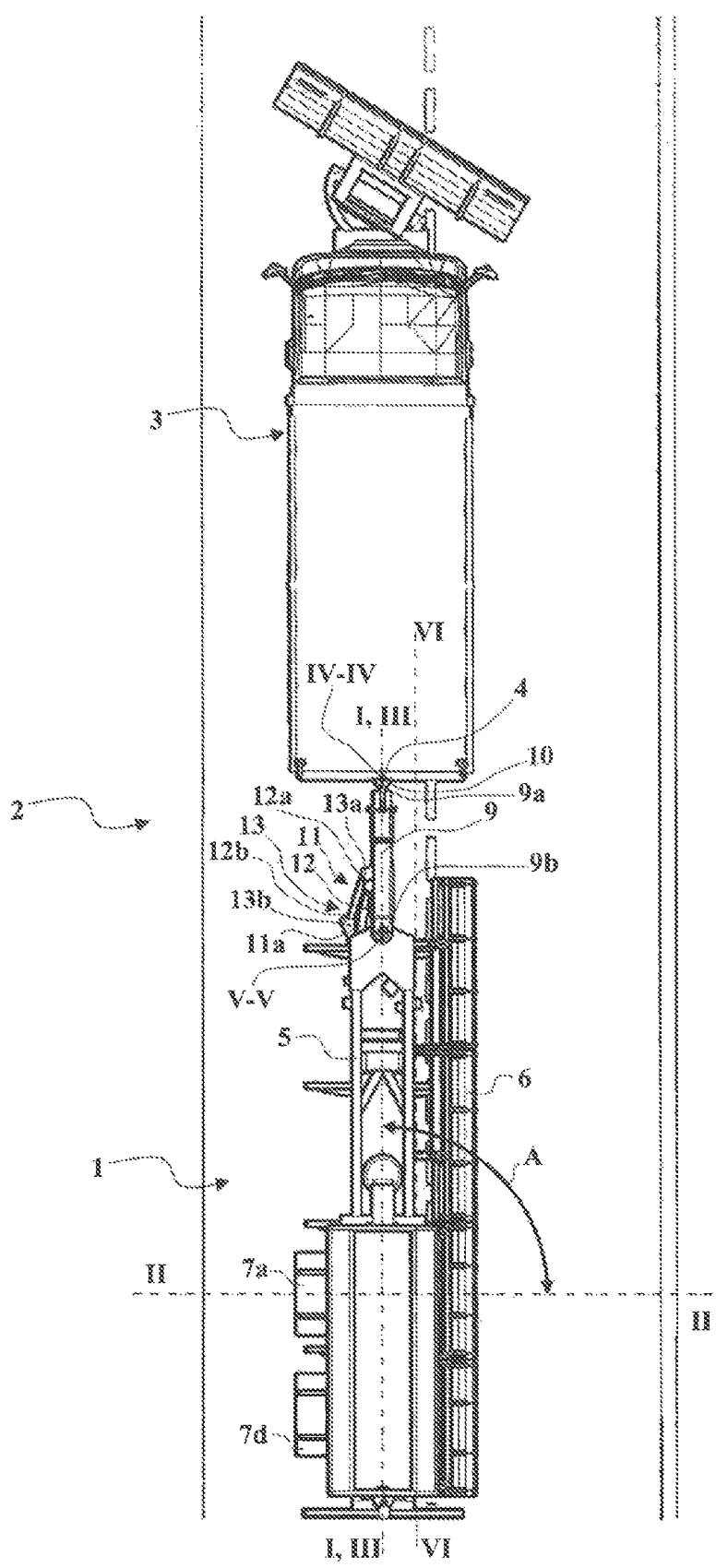
FIG. 1 is a schematic view from above of a snow-clearing assembly comprising a snow-clearing trailer according to the present invention, of which said at least one wheel is in the first wheel position.
Figure 2:
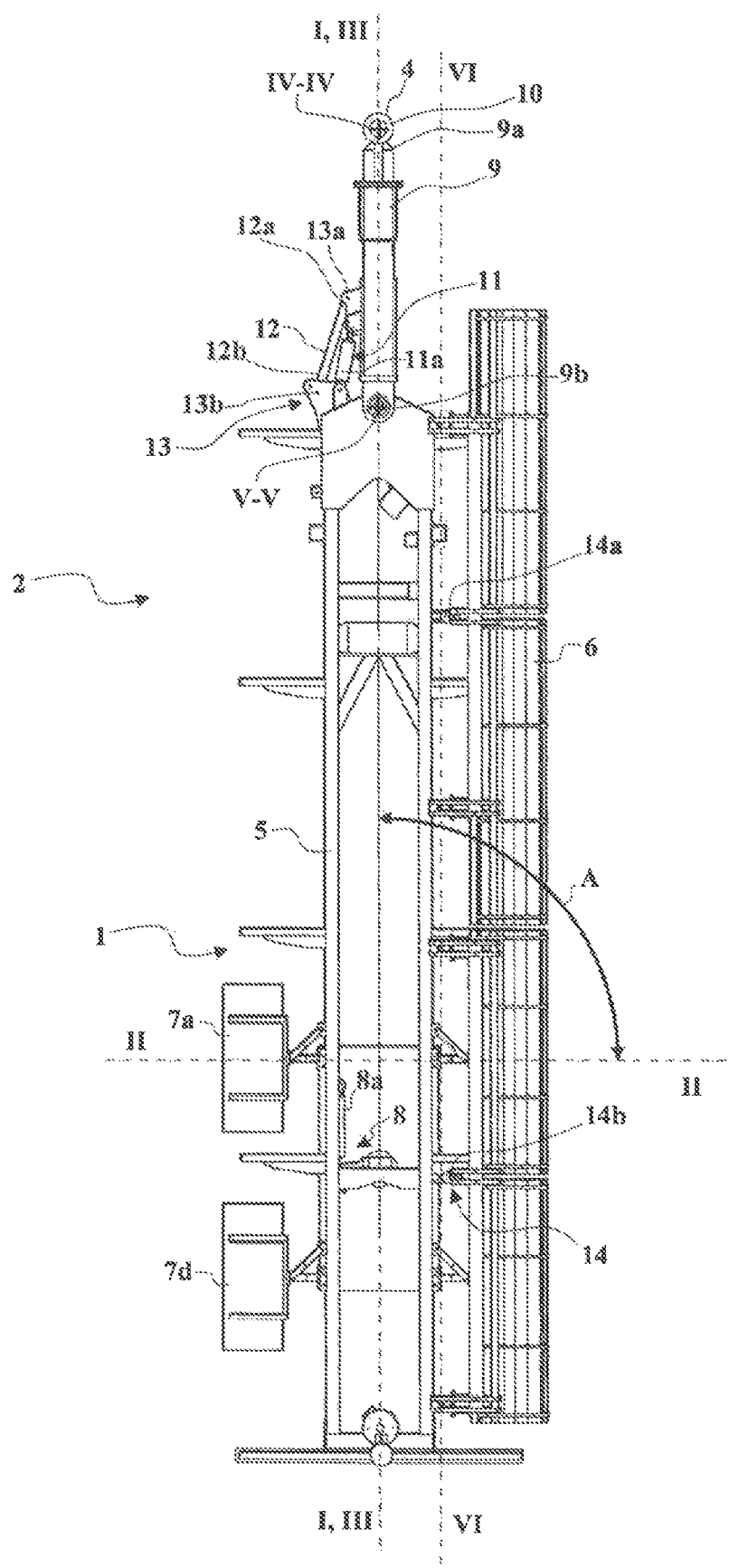
FIG. 2 is a schematic view from above of a part of the snow-clearing trailer of the snow-clearing assembly in FIG. 1.
Figure 3:
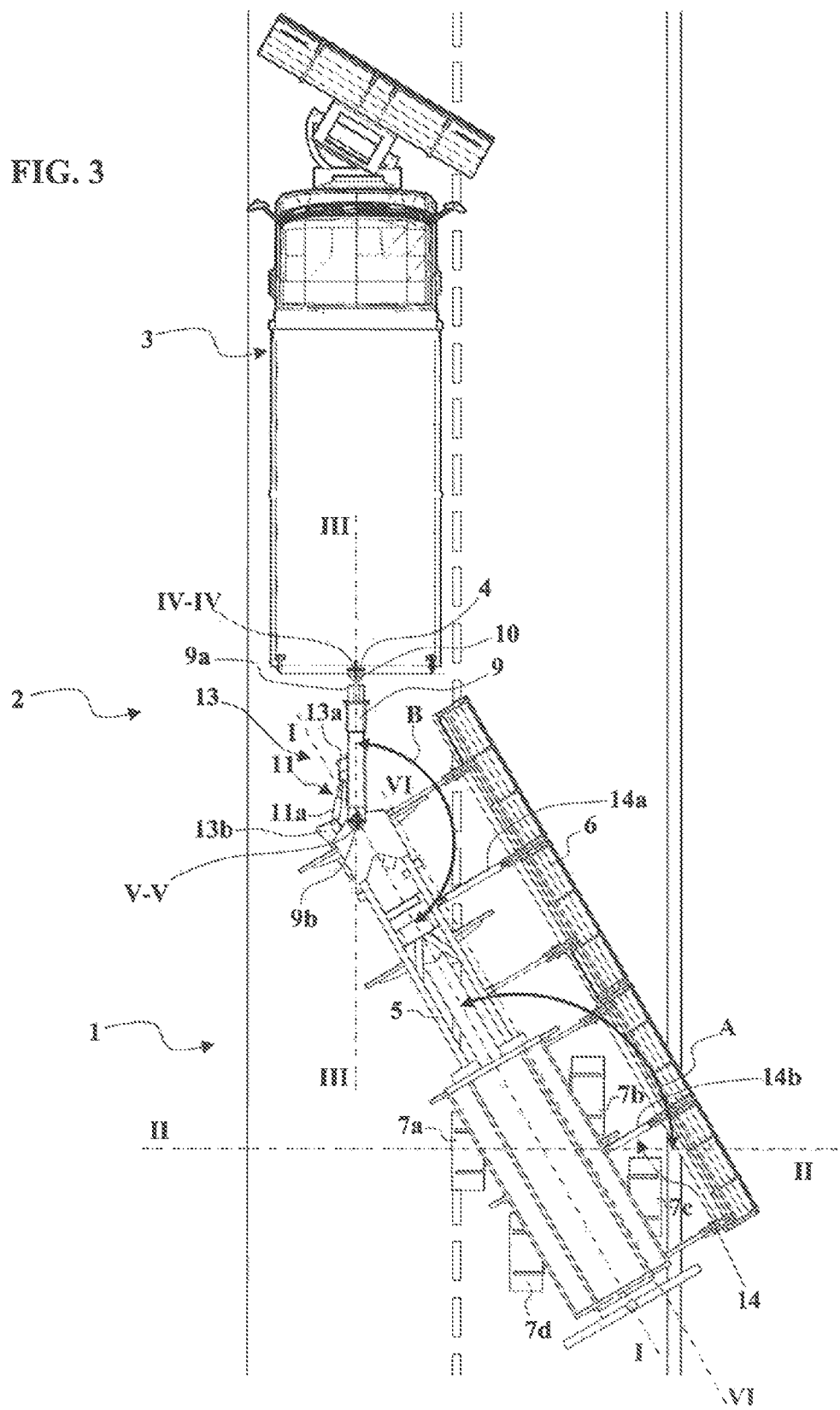
FIG. 3 is a schematic view from above of the snow-clearing assembly with the snow-clearing trailer of which said at least one wheel is in the second wheel position.

FIGS. 1 to 5 illustrate an exemplary embodiment of a snow-clearing trailer 1 according to the present invention, which is used in a snow-clearing assembly 2 in FIGS. 1 and 3 that also comprises a towing vehicle 3 that tows the snow-clearing trailer.

The snow-clearing trailer 1 is of the type that is able to pivot between a transport position (FIGS. 1 and 2) and a snow-clearing position (FIGS. 3 and 4), as described in the document EP 3 196 361 A1.

The snow-clearing trailer 1 is intended to be towed by the towing vehicle 3 with a towing hitch 4. Said snow-clearing trailer 1 has a chassis 5 extending longitudinally in a chassis direction I-I and having a snow-clearing blade 6

Four wheels 7a to 7d are arranged so as to support the chassis 5 on the ground, the axles of said wheels 7a to 7d being selectively orientable by orientation means 8 between a first wheel position (FIGS. 1 and 2), in which the axes of axles about which the wheels 7a to 7d rotate are perpendicular to the chassis direction I-I, and at least a second wheel position (FIGS. 3 and 4), in which the axes of the axles about which the wheels 7a to 7d rotate make with the chassis direction I-I an axle angle A that is different than (greater than) 90°.

In this case, the axes of axles of the wheels 7a to 7d are parallel to an axle direction II-II.

A drawbar 9 extends in a drawbar direction III-III between first 9a and second 9b drawbar ends.

At the first drawbar end 9a, first connection means 10 allow a freely pivoting connection with the towing hitch 4 of the towing vehicle 3 about a first pivoting direction IV-IV substantially perpendicular to the plane defined by the chassis direction I-I and the axes of axles about which said wheels 7a-7d rotate (therefore perpendicular to the plane defined by the chassis direction I-I and the axle direction II-II).

At the second drawbar end 9b, the drawbar 9 is articulated to the chassis 5 so as to pivot about a second pivoting direction V-V substantially perpendicular to the plane defined by the chassis direction I-I and the axes of the axles about which the wheels 7a-7d rotate (therefore perpendicular to the plane defined by the chassis direction I-I and the axle direction II-II).

Pivoting means 11 allow the selective pivoting movement of the chassis 5 of the trailer 1 and the drawbar 9 with respect to one another, and the fixing of the relative angular position of the chassis 5 of the trailer 1 and of the drawbar 9, between a transport position (FIGS. 1 and 2), in which the chassis direction I-I and the drawbar direction III-III are substantially parallel, and at least one snow-clearing position (FIGS. 3 and 4), in which the chassis direction I-I and the drawbar direction III-III form a non-zero angle B with one another.

Figure 4:
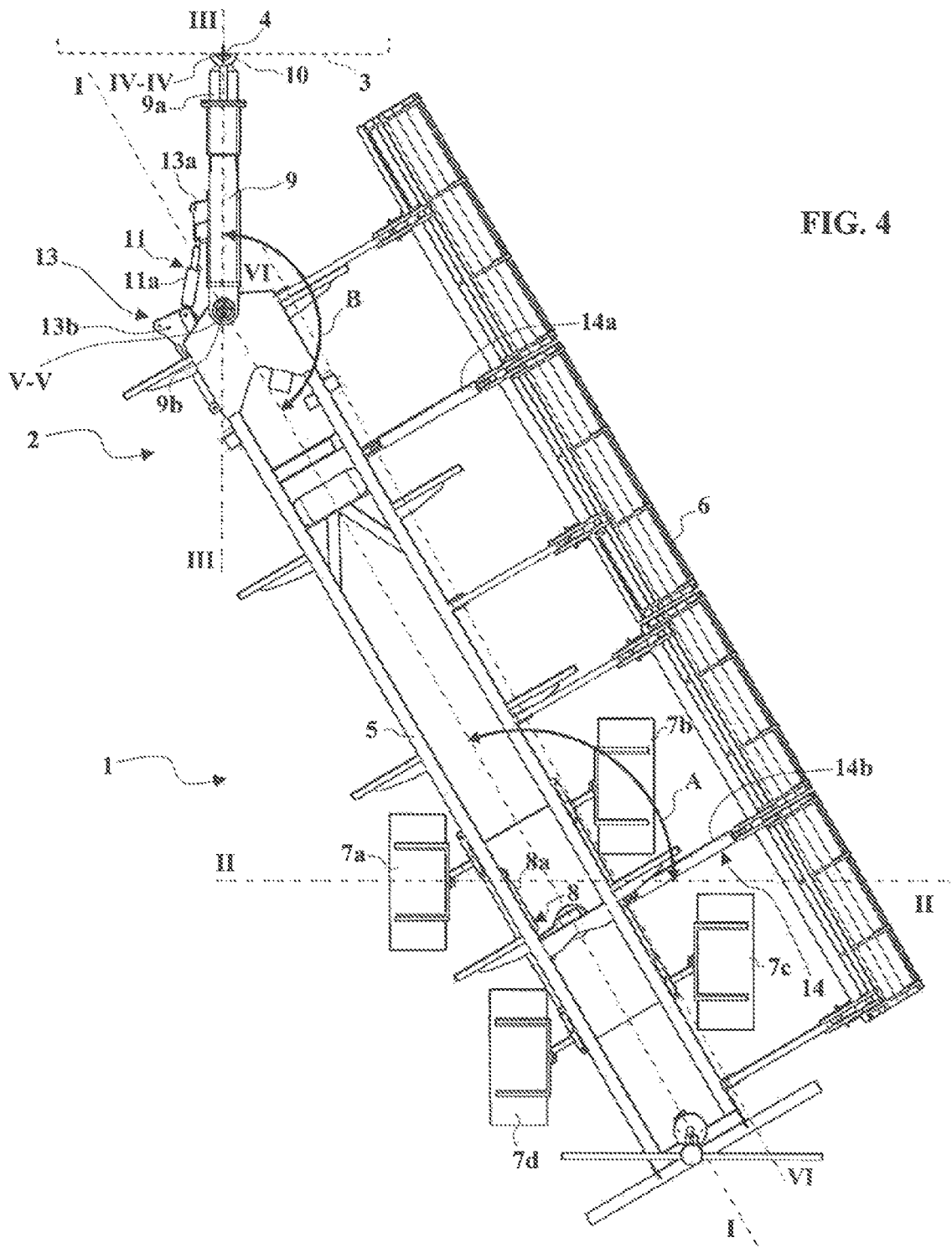
FIG. 4 is a schematic view from above of a part of the snow-clearing trailer of the snow-clearing assembly in FIG. 3.
Figure 5:
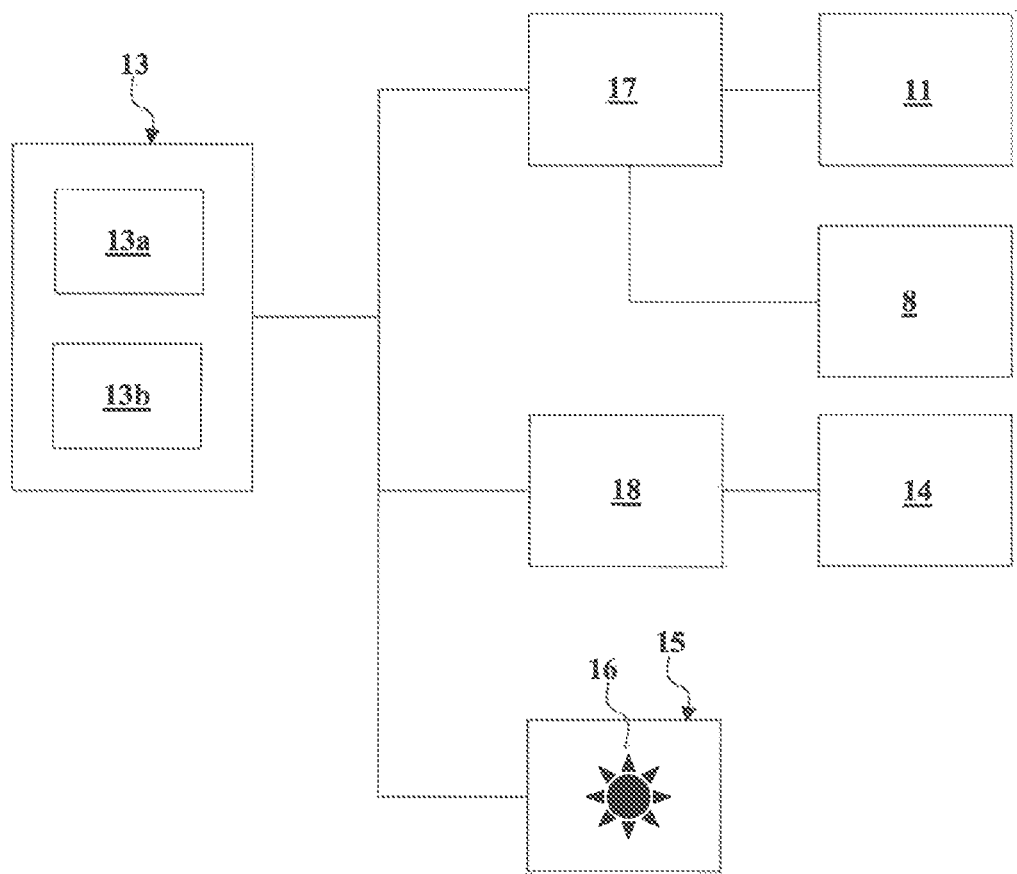
FIG. 5 is a schematic view illustrating the operation of the detection means, the disabling means and the alarm means.

It can be seen more particularly in FIGS. 2 and 4 that the orientation means 8 comprise in particular a double-acting hydraulic cylinder 8a, while the pivoting means 11 comprise in particular a double-acting hydraulic cylinder 11a.

It can be seen more particularly in FIG. 2 that a drawbar locking bar 12 is provided, which has a fixed length, of which one end 12a can be attached to the drawbar 9 and of which the other end 12b can be attached to the chassis 5 so as to immobilize the drawbar 9 on the chassis 5 in the transport position (FIGS. 1 and 2).

The snow-clearing trailer 1 has detection means 13, which are able to generate an attachment signal when the drawbar locking bar 12 is attached to the drawbar 9 and to the chassis 5.

In the present case, the detection means 13 have a first proximity sensor 13a that is able to detect the presence of the end 12a of the drawbar locking bar 12 on the drawbar 9, and a second proximity sensor 13b that is able to detect the presence of the end 12b of the drawbar locking bar 12 on the chassis 5. When the first and second sensors 13a and 13b respectively detect the presence of the ends 12a and 12b of the drawbar locking bar 12, the detection means 13 emit a signal of attachment of the drawbar locking bar 12.

The proximity sensors 13a and 13b can be for example inductive sensors or capacitive sensors.

In the case in which the drawbar locking bar 12 is articulated in a non-detachable manner on the chassis 5 (respectively on the drawbar 9) via its end 12a (respectively via its end 12b), the detection means 13 can comprise only a single proximity sensor on the drawbar 9 (respectively on the chassis 5), which is able to detect the presence of the end 12a of the drawbar locking bar 12 on the drawbar 9 (respectively able to detect the presence of the end 12b of the drawbar locking bar 12 on the chassis 5).

The snow-clearing trailer 1 also has first disabling means 17 that are able to disable the pivoting means 11. The first disabling means 17 and the detection means 13 are arranged in such a way that when the detection means 13 generate an attachment signal, the first disabling means 17 prevent any actuation of the pivoting means 11.

In the present case, the first disabling means 17 are also able to disable the orientation means 8. The first disabling means 17 and the detection means 13 are arranged in such a way that when the detection means 13 generate an attachment signal, the first disabling means 17 prevent any actuation of the orientation means 8.

The snow-clearing blade 6 is articulated so as to pivot on the chassis 5 and is movable, by movement means 14 (comprising two hydraulic cylinders 14a and 14b), about a blade pivoting direction VI-VI substantially parallel to the chassis direction I-I, between a rest position (FIGS. 1 and 2) and a working position (FIGS. 3 and 4). In the working position, the snow-clearing blade 6 can come into contact with the roadway so as to scrape the snow. In the rest position, the snow-clearing blade 6 is lifted away from the roadway.

The snow-clearing trailer 1 has second disabling means 18 that are able to disable the movement means 14. The second disabling means 18 and the detection means 13 are arranged in such a way that when the detection means 13 generate an attachment signal, the second disabling means 18 prevent any actuation of the movement means 14.

So that the operator controlling the snow-clearing assembly 2, stationed in the driving cab of the towing vehicle 3, is informed of the presence (or absence) of the drawbar locking bar 12, alarm means 15 are provided, which are able to generate an alarm signal that is perceivable by the operator stationed in the driving cab of the towing vehicle 3 when the detection means 13 generate an attachment signal. The alarm signal is a visual signal such as a fixed or flashing indicator light 16.

The operation of the present invention will now be explained in connection with FIGS. 1 to 5.

When the snow-clearing trailer 1 is brought to a roadway to be cleared of snow, it is in the transport position, as illustrated in FIGS. 1 and 2.

The drawbar locking bar 12 immobilizes the drawbar 9 with respect to the chassis 5. The proximity sensors 13a, 13b detect the ends 12a and 12b of the drawbar locking bar 12 such that the detection means 13 generate an attachment signal. As a consequence, the first disabling means 17 prevent any actuation of the pivoting means 11 (and in this case also prevent any actuation of the orientation means 8), and the second disabling means 18 prevent any actuation of the movement means 14. The operator is warned of the presence of the drawbar locking bar 12 by the alarm means 15 that generate an alarm signal. In practice, the alarm signal consists of the switching on of an indicator light 16 such that it is fixed or flashing.

When wishing to use the snow-clearing trailer 1 to clear snow from the roadway, the operator starts by removing the drawbar locking bar 12. The proximity sensors 13a and 13b then no longer detect the ends 12a and 12b of the drawbar locking bar 12, and the detection means 13 no longer generate an attachment signal. The first disabling means 17 and second disabling means 18 then no longer prevent actuation of the pivoting means 11, the orientation means 8 and the movement means 14. This is perceivable in the cab of the towing vehicle 3 by the switching off of the indicator light 16 of the alarm means 15.

The operator can then actuate, in complete safety, the pivoting means 11, the orientation means 8 and the movement means 14 so as to bring the snow-clearing trailer 1 into a snow-clearing position as illustrated in FIGS. 3 and 4.

Once the snow has been cleared, the operator actuates the pivoting means 11, the orientation means 8 and the movement means 14 so as to bring the snow-clearing trailer 1 back into the transport position as illustrated in FIGS. 1 and 2.

In order to secure the snow-clearing trailer 1 during its travel, the operator puts the drawbar locking bar 12 back in place by attaching its first and second ends 12a and 12b respectively to the drawbar 9 and to the chassis 5. By virtue of the detection means 13 and the first disabling means 17 and second disabling means 18, simply putting the drawbar locking bar 12 in place has the effect of preventing any subsequent actuation of the pivoting means 11, the orientation means 8 and the movement means 14. The operator in the driving cab of the towing vehicle 3 is informed that this disabling is active by the indicator light 16 of the alarm means 15 that is switched on: the operator knows that he or she can then drive in complete comfort on the roadway, without risking unwanted deployment of the snow-clearing trailer 1 toward a snow-clearing position.

It should be noted that a snow-clearing trailer 1 can have first disabling means 17 without necessarily also having second disabling means 18.

The present invention is not restricted to the embodiments that have been explicitly described, but includes the various variants and generalizations thereof that come within the scope of the claims hereinbelow.

The invention claimed is:

1. A snow-clearing trailer (1) intended to be towed by a towing vehicle (3) with a towing hitch (4), said snow-clearing trailer (1) having:
- a chassis (5) extending longitudinally in a chassis direction (I-I) and having a snow-clearing blade (6),
- at least one wheel (7a-7d) arranged so as to support the chassis (5) on the ground, an axle of said wheel (7a-7d) being selectively orientable by orientation means (8) between a first wheel position, in which an axis of the axle about which the wheel (7a-7d) rotates is perpendicular to the chassis direction (I-I), and at least a second wheel position, in which the axis of the axle about which the wheel (7a-7d) rotates makes with the chassis direction (I-I) an axle angle (A) that is different than 90°,
- a drawbar (9) extending in a drawbar direction (III-III) between first (9a) and second (9b) drawbar ends,
- at the first drawbar end (9a), first connection means (10) allowing a freely pivoting connection with the towing hitch (4) of the towing vehicle (3) about a first pivoting direction (IV-IV) substantially perpendicular to a plane defined by the chassis direction (I-I) and the axis of the axle about which said at least one wheel (7a-7d) rotates, wherein:
- at the second drawbar end (9b), the drawbar (9) is articulated to the chassis (5) so as to pivot about a second pivoting direction (V-V) substantially perpendicular to the plane defined by the chassis direction (I-I) and the axis of the axle about which said at least one wheel (7a-7d) rotates,
- pivoting means (11) allow a selective pivoting movement of the chassis (5) of the trailer (1) and the drawbar (9) with respect to one another, and fixing the relative angular position (B) of the chassis (5) of the trailer (1) and of the drawbar (9), between a transport position, in which the chassis direction (I-I) and the drawbar direction (III-III) are substantially parallel, and at least one snow-clearing position, in which the chassis direction (I-I) and the drawbar direction (III-III) form a non-zero angle (B) with one another,
- a drawbar locking bar (12) is provided, which has a fixed length, of which one end (12a) can be attached to the drawbar (9) and of which the other end (12b) can be attached to the chassis (5) so as to immobilize the drawbar (9) on the chassis (5) in the transport position, wherein:
- the snow-clearing trailer (1) has detection means (13), to generate an attachment signal when the drawbar locking bar (12) is attached to the drawbar (9) and to the chassis (5),
- the snow-clearing trailer (1) has first disabling means (17) to disable the pivoting means (11),
- the first disabling means (17) and the detection means (13) are arranged in such a way that when the detection means (13) generate an attachment signal, the first disabling means (17) prevent any actuation of the pivoting means (11).

2. The snow-clearing trailer (1) as claimed in claim 1, wherein:
- the first disabling means (17) are configured to disable the orientation means (8),
- the first disabling means (17) and the detection means (13) are arranged in such a way that when the detection means (13) generate an attachment signal, the first disabling means (17) prevent any actuation of the orientation means (8).

3. A snow-clearing assembly (2) having:
- a snow-clearing trailer (1) as claimed in claim 1,
- the towing vehicle (3),
- alarm means (15), to generate an alarm signal that is perceivable by an operator stationed in the driving cab of the towing vehicle (3), preferably a visual alarm signal, when the detection means (13) generate an attachment signal.

4. The snow-clearing trailer (1) as claimed in claim 1, wherein:
- the snow-clearing blade (6) is articulated so as to pivot on the chassis (5) and is movable, by movement means (14), about a blade pivoting direction (VI-VI) substantially parallel to the chassis direction (I-I), between a rest position and a working position,
- the snow-clearing trailer (1) has second disabling means (18) that are configured to disable the movement means (14),
- the second disabling means (18) and the detection means (13) are arranged in such a way that when the detection means (13) generate an attachment signal, the second disabling means (18) prevent any actuation of the movement means (14).

5. The snow-clearing trailer (1) as claimed in claim 1, wherein the detection means (13) have at least one proximity sensor (13a, 13b) that is configured to detect the presence of an end (12a, 12b) of the drawbar locking bar (12) on the chassis (5) and/or on the drawbar (9).

6. The snow-clearing trailer (1) as claimed in claim 5, wherein the proximity sensor (13a, 13b) is an inductive sensor or a capacitive sensor.

* * * * *